United States Patent
Takahashi

(10) Patent No.: US 6,326,074 B1
(45) Date of Patent: Dec. 4, 2001

(54) SYNCHRONOUSLY EMBOSSED DECORATIVE SHEET AND METHOD FOR PRODUCING THE SAME

(75) Inventor: Kazuhiro Takahashi, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/314,897

(22) Filed: May 19, 1999

(30) Foreign Application Priority Data

May 20, 1998 (JP) .................................................. 10-139038

(51) Int. Cl.⁷ ....................................................... B32B 3/00
(52) U.S. Cl. ........................ 428/156; 428/195; 428/201; 428/203; 428/206; 428/207; 428/325
(58) Field of Search ................................ 428/195, 201, 428/203, 206, 207, 156, 325

(56) References Cited

FOREIGN PATENT DOCUMENTS

| 51-41364 | 2/1974 | (JP) . |
| 54-011969 | * 1/1979 | (JP) . |
| 1-14824 | 12/1984 | (JP) . |
| 4-35337 | 3/1990 | (JP) . |
| 07-009651 | * 1/1995 | (JP) . |

OTHER PUBLICATIONS

JP–54–011969A, DWPI english abstract, Jan. 1979.*
JP–54–011969A, JPAB english abstract, Jan. 1979.*
JP–07–009651A, JPAB english abstract, Jan. 1995.*

* cited by examiner

Primary Examiner—Cynthia H. Kelly
Assistant Examiner—B. Shewareged
(74) Attorney, Agent, or Firm—Parkhurst & Wendel, LLP

(57) ABSTRACT

A synchronously embossed decorative sheet is provided which has excellent three-dimensional effect in sharp tune with a pattern layer and, at the same time, has good scratch resistance. The synchronously embossed decorative sheet comprises: a substrate; a pattern layer provided on the substrate; a penetrable layer provided on the substrate at least in its portions not having thereon the pattern layer, the penetrable layer comprising a coating composition penetrable by an ionizing radiation curing resin; a nonpenetrable layer provided, on or above the pattern layer, in tune with the pattern in the pattern layer, the nonpenetrable layer comprising a coating composition nonpenetrable by an ionizing radiation curing resin; and a top coat provided so as to cover the layers on the substrate and to conform to the shape of concaves and convexes in the pattern layer.

10 Claims, 2 Drawing Sheets

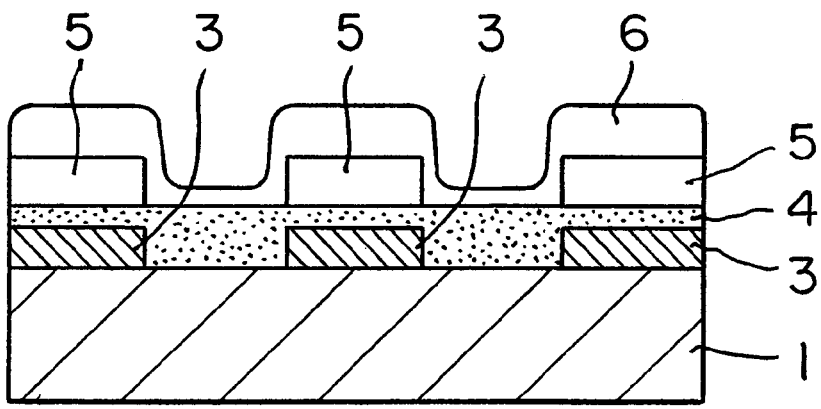
F I G. 2

SYNCHRONOUSLY EMBOSSED DECORATIVE SHEET AND METHOD FOR PRODUCING THE SAME

TECHNICAL FIELD

The present invention relates to a decorative sheet, and more particularly to a synchronously embossed (tune-embossed) decorative sheet which is suitable for interior decoration of buildings, surface decoration of fittings and fixtures, interior decoration of vehicles and the like and has concaves and convexes sharply tuned with a pattern, and a process for producing the same.

BACKGROUND OF THE INVENTION

A coated decorative sheet comprising a substrate sheet, such as paper or a plastic sheet, having thereon a color solid layer, a pattern layer with a pattern of a grain or the like printed thereon, and a top coat for protecting the surface of the decorative sheet has hitherto been known as a decorative sheet for use in interior decoration of buildings, surface decoration of fittings and fixtures, interior decoration of vehicles and other applications.

An attempt to express three-dimensional effect has been made to prepare decorative paper having realistic appearance close to the actual object. For the formation of concaves and convexes used in decorative sheets, for example, a method has been proposed wherein a pattern having different gloss is printed to form, on the same plane (within the surface), a visual combination of a gloss region with a non-glass region, thereby forming pseudo concaves and convexes through the utilization of such an illusion that the gloss region is visually seen as a convex with the non-gloss region being visually seen as a concave. A conventional method for the formation of pseudo concaves and convexes using a gloss region and a non-gloss region is disclosed in Japanese Patent Publication No. 41364/1976. According to this method, patterns are formed using a plurality of inks different from each other in particulate solids, and a solvent type top coat is formed thereon to create a difference in penetration of the coating composition among patterns to form pseudo concaves and convexes through the utilization of a gloss-non-gloss pattern.

In the conventional concave-convex pattern by creating a difference in penetration of the coating composition, however, the difference in level between concave and convex is small, and the boundary between concave and convex is not sharp. Therefore, the visual three-dimensional effect is unsatisfactory. Further, the conventional decorative sheet having a concave-convex patter is likely to cause surface scratches, and then has a problem of durability.

Further, Japanese Patent Publication No. 14824/1989 proposes a method for the formation of concaves and convexes on the surface of a decorative material which comprises forming, on a substrate, patterns using a penetrable coating composition and a solvent-resistant ink and coating thereon a top coat coating composition comprising an electron beam curing resin, followed by curing to form concaves and convexes through the utilization of a difference in penetration.

According to the finding of the present inventors, however, since the solvent-resistant ink per se contains a pigment (inorganic particles), the penetration unavoidably occurs, leading to a reduction in difference in penetration between the solvent-resistant ink and the penetrable coating composition. This renders reduction difference the difference in level between concaves and convexes unsatisfactory, and the reality and the three-dimensional effect are poor. Use of a solvent-resistant ink with the pigment being removed therefrom can emphasize the difference in penetration between the pattern of the penetrable coating composition and the pattern of the solvent-resistant ink. In this case, however, the pattern of the solvent-resistant ink is colorless, and this is unacceptable from the viewpoint of reproduction of appearance and design.

Accordingly, it is an object of the present invention to provide a synchronously embossed decorative sheet which has excellent three-dimensional effect in sharp tune with a pattern layer and, at the same time, is less likely to cause scratches, and to provide a process for producing the same.

DISCLOSURE OF THE INVENTION

In order to attain the above object of the present invention, there is provided a synchronously embossed decorative sheet comprising:

a substrate;

a pattern layer provided on the substrate;

a penetrable layer provided on the substrate at least in its portions not having thereon the pattern layer, the penetrable layer comprising a coating composition being penetrable by an ionizing radiation curing resin;

a nonpenetrable layer provided, on the pattern layer, in tune with the pattern in the pattern layer, the nonpenetrable layer comprising a coating composition being nonpenetrable by an ionizing radiation curing resin; and a top coat layer provided so as to cover said layers on the substrate and to conform to the shape of concaves and convexes in the pattern layer.

According to another aspect of the present invention, there is provided a process for producing a synchronously embossed decorative sheet, comprising the steps of:

forming a pattern layer on a substrate;

applying a coating composition penetrable by an ionizing radiation curing resin onto the substrate at least in its portions not having thereon the pattern layer to form a penetrable layer;

applying a coating composition nonpenetrable by an ionizing radiation curing resin onto the pattern layer so as to tune with the pattern of the pattern layer to form a nonpenetrable layer; and applying a coating composition containing an ionizing radiation curing resin so as to cover the layers on the substrate and to conform to the shape of concaves and convexes in the pattern layer and applying an ionizing radiation to the assembly to form a top coat having concaves and convexes in tune with the pattern of the pattern layer.

According to the present invention, a nonpenetrable layer is formed on a pattern layer so as to tune with the pattern of the pattern layer, and a top coat is formed thereon. This arrangement enables concaves and convexes to be more effectively formed, and the difference in level in emboss of the pattern in the pattern layer can be further increase. Therefore, a more realistic appearance close to the actual object can be developed. Further, according to the present invention, a pattern layer containing a colorant, such as a pigment, and a nonpenetrable layer for preventing the penetration of the ionizing radiation curing resin constituting the top coat are provided separately in a stacked form in the thicknesswise direction. This structure can offer the following synergistic effect.

Specifically, the function of the pattern layer can be separated from the function of the nonpenetrable layer provided in tune with the pattern layer. That is, a desired pigment can be freely used in the pattern layer without undergoing the influence of the pigment in the pattern layer. Further, since the nonpenetrable layer is further provided in combination with the pattern layer, the penetration of the ionizing radiation curing layer constituting the top coat can be effectively prevented. Therefore, both this penetration preventive effect and the stacking effect attained by provision of the pattern layer and the nonpenetratable layer in combination in a stacked form in the thicknesswise direction can render the embossing effect of the pattern in the pattern layer more conspicuous.

Further, according to the present invention, a solvent-free coating composition may be used as the top coat. Therefore, a reduction in layer thickness does not occur upon curing of the top coat, and the thickness of the coating immediately after the formation remains unchanged upon conversion to the cured layer. Therefore, as compared with the use of a solvent type resin in the top coat, the use of the solvent-free coating composition can provide higher emboss height and hence can provide a sharper emboss.

Further, according to the synchronously embossed decorative sheet of the present invention, since a coating composition containing an ionizing radiation curing resin is used in the top coat, the surface hardness is so high that the scratch resistance is good.

BRIEF DESCRIPTION OF THE DRAWINGS

FIG. 2 is a cross-sectional view of a synchronously embossed decorative sheet according to another aspect of the present invention.

BEST MODE FOR CARRYING OUT THE INVENTION

FIGS. 1A to 1E are cross-sectional view showing the production process of a synchronously embossed decorative sheet according to a preferred embodiment of the present invention. The steps of the production process will be briefly described.

Figure 1A:
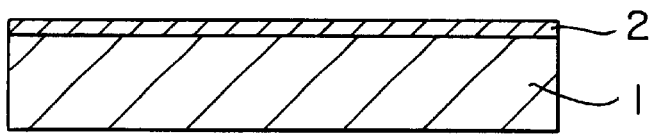
FIGS. 1A to 1E are cross-sectional views showing the production process of a synchronously embossed decorative sheet according to the present invention.
Figure 1B:
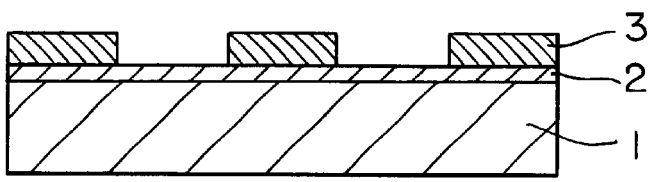

As shown in FIG. 1A, if necessary, a color solid print 2 is formed by printing or coating on a substrate sheet 1. Next, as shown in FIG. 1B, a pattern layer 3 of a specific pattern is formed by printing on a part of the color solid print 2.

Figure 1C:
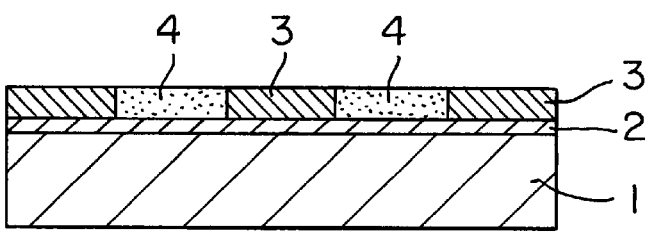

As shown in FIG. 1C, a composition penetrable by a coating composition containing an ionizing radiation curing resin is then applied by printing or the like on the surface of the color solid print in its portions not having the pattern 3 to form a penetrable layer 4. Therefore, according to this embodiment, the pattern layer 3 and the penetrable layer 4 are in a negative-positive relationship.

Figure 1D:
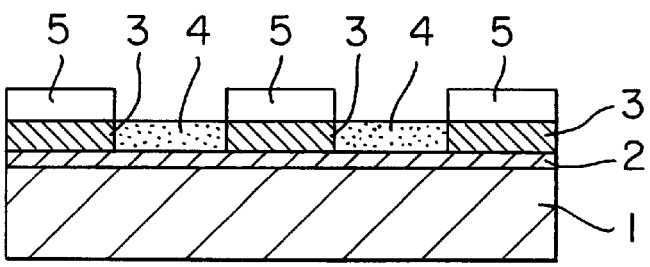

Next, as shown in FIG. 1D, a coating composition nonpenetrable by a coating composition containing an ionizing radiation curing resin is applied by printing or the like only on the pattern layer 3 so as to tune with the pattern of the pattern layer to form a nonpenetrable layer 5.

Figure 1E:
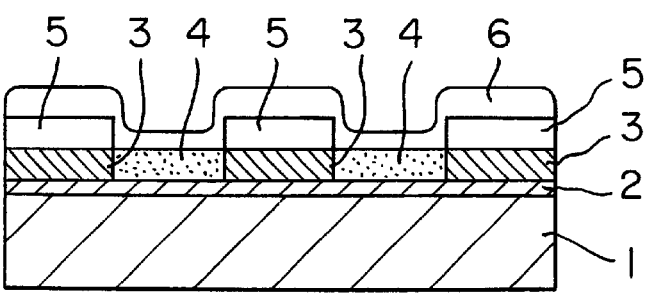

Next, as shown in FIG. 1E, a coating composition containing an ionizing radiation curing resin is coated on the whole surface of the printed surface to form a top coat 6. At that time, the ionizing radiation curing resin on the penetrable layer 4 penetrates into the penetrable layer 4. This reduces the thickness of the top coat 6 in it portions located on the penetrable layer 4. On the other hand, the top coat 6 in its portions located on the nonpenetrable layer 5 does not penetrate into the nonpenetrable layer, and the thickness thereof remains unchanged from the thickness immediately after the coating. In this state, an ionizing radiation is applied to cure the coating to obtain the decorative sheet of the present invention. As shown in FIG. 1E, the layer construction of the decorative sheet thus obtained is a synchronously embossed decorative sheet which has a large difference in level in emboss and possesses sharp and excellent three-dimensional effect.

FIG. 2 is a cross-sectional view of the decorative sheet according to another preferred embodiment of the present invention. This decorative sheet is the same as the embodiment shown in FIG. 1, except that the penetrable layer 4 is applied on the whole surface of the substrate 1.

Materials constituting the decorative sheet according to the present invention will be described.

Substrate

According to the present invention, the substrate may be a sheet, film, or plate. Specific examples of sheet or film substrates usable herein include various papers, converted papers, and synthetic papers, such as tissue paper, kraft paper, linter paper, and resin-impregnated paper, resin films or sheets of cellophane, acetate, polyolefins, such as polyethylene or polypropylene, polyesters, polyvinyl chloride, polyvinylidene chloride, polystyrene, polycarbonate, polyamide and the like, metallic films or sheets of iron, aluminum, copper and the like, wood films or sheets, and laminates of films or sheets selected from the above materials. Specific examples of plate substrates usable herein include plates of the resins and metals exemplified above in connection with the above films or sheets, wood plates, and glass plates.

Color solid print

In the present invention, the color solid print is optionally provided. The color print functions to conceal the color on the surface of the substrate and at the same time to prevent the penetration of the ink or the coating composition printed or coated thereon into the substrate. Inks usable for the color solid print include conventional gravure inks.

In particular, when the substrate is constituted by a porous or penetrable material, such as paper, the color solid print functions as a penetration preventive layer.

Pattern layer

According to the present invention, ink compositions for the pattern layer include conventional gravure inks, for example, inks comprising pigments, such as carbon black, titanium white, chrome yellow, iron oxide red, and ultramarine blue, added to a cellulosic resin, such as nitrocellulose, cellulose acetate, or cellulose acetate propionate, an acrylic resin, such as polymethyl (meth) acrylate or polybutyl (meth) acrylate, a polyester resin, a urethane resin, or a butyral resin. However, the ink composition is not limited to these only.

Patterns usable in the present invention include grains, rifts, and tile patterns. However, the present invention is not limited to these patterns only, and is applicable to all patterns wherein a concave-convex pattern is imparted thereto to improve the appearance and the feel.

Penetrable layer

According to the present invention, the penetrable layer comprises a coating composition penetrable by an ionizing radiation curing resin constituting the top coat described below. More specifically, the composition for the penetrable layer comprises a given amount of inorganic particles contained in a binder resin with the balance consisting of a solvent.

Examples of preferred binder resins usable herein include butyral resin, urethane resin, polyester resin, acrylic resin, vinyl chloride/vinyl acetate copolymer, and cellulose resin. Particularly preferred is butyral resin. The present inventors have found that, in the case of butyral resin, the difference in penetration between the presence of inorganic particles and the absence of inorganic particles is significant. Therefore, butyral resin is particularly preferred for attaining the object of the present invention.

The inorganic particles for imparting penetrability to the composition are not particularly limited so far as they can impart the penetrability. They, however, are generally selected from particles of silica, calcium carbonate, zeolite, alumina, kaolinite, titanium dioxide, mica, and barium sulfate.

The average particle diameter of the inorganic particles is preferably 5 to 20 $\mu$m.

Regarding the compounding ratio, the coating composition for the penetrable layer preferably comprises less than 5% by weight of the binder resin and 10 to 60% by weight of the inorganic particles.

Further, according to the present invention, the penetrability can also be imparted by incorporating a foaming agent into the binder resin. Foaming agents usable herein include azodicarbonamide and oxybisbenzenesulfonylhydrazide. When the foaming agent is used, the amount thereof added is preferably 1 to 10% by weight.

In addition to the above embodiment, the penetrable layer may also be formed by a method wherein the penetrable layer is printed as an aggregate of dots (cells) and, at the same time, a penetrable material, such as paper or a nonwoven fabric, is selected as the substrate. According to this embodiment, the printing ink for the penetrable layer may be a nonpenetrable ink.

The penetrable layer formed by coating, upon curing or drying, generally becomes a cured product or solid matter of the coating composition.

Nonpenetrable layer

According to the present invention, the nonpenetrable layer comprises a coating composition which is nonpenetrable by an ionizing radiation curing resin constituting the top coat described below. More specifically, the composition for the nonpenetrable layer comprises a binder resin and a solvent. Preferred examples thereof include conventional composition for OP (overprint varnish) or two component curable OP coating composition.

The binder resin is preferably an ionizing radiation curing resin. Preferred examples thereof include butyral resin, urethane resin, polyester resin, acrylic resin, vinyl chloride/ vinyl acetate copolymer, and cellulose resin. Among them, butyral resin is particularly preferred.

Less than 5% by weight of inorganic particles (for example, particles of extender pigments) may be incorporated to the composition from the viewpoint of printability, particularly prevention of blocking at the time of rolling. In this case, if the amount of the inorganic particles added exceeds 5% by weight, the composition becomes penetrable by the ionizing radiation curing resin constituting the top coat. Therefore, the addition of the inorganic particles in the above amount range is preferred.

The nonpenetrable layer formed by coating, upon curing or drying, generally becomes a cured product or solid matter of the coating composition.

Top coat

According to the present invention, the top coat is formed using a coating composition comprising an ionizing radiation curing resin and substantially free from a solvent.

The top coat should have scratch resistance high enough to protect the print. Formation of the coat using a hard, that is, low-viscosity, ionizing radiation curing resin results in increased number of crosslinking sites to render the top coat fragile. Therefore, this ionizing radiation curing resin is unsuitable for flexible decorative sheets. Further, when the coating composition containing an ionizing radiation curing resin for the top coat has low viscosity, the coating composition excessively penetrates into the interior and reaches the substrate sheet. This excessive penetration adversely affects the substrate sheet. For this reason, the viscosity of the coating composition containing an ionizing radiation curing resin for the decorative sheet is preferably 100 to 2000 cp, particularly preferably 100 to 1000 cp.

According to the present invention, the ionizing radiation curing resin is preferably an ionizing radiation-curable composition which, according to need, contains a prepolymer (including the so-called "oligomer") and/or a monomer having in its molecule a polymerizable unsaturated bond or a cationically polymerizable functional group. The term "ionizing radiation" used herein refers to, among electromagnetic waves or charged particle beams, those having energy quanta high enough to polymerize or crosslink molecules. In general, ultraviolet light (UV) or electron beam (EB) is used.

The ionizing radiation curing resin for a hard coat comprises a monomer or a prepolymer having in its molecule two or more groups selected from radically polymerizable unsaturated groups, such as (meth) acryloyl and (meth) acryloyloxy, cationically polymerizable functional groups, such as epoxy, and thiol. These monomers or prepolymers may be used alone or as a mixture of two or more. Here, the term, having appended thereto, "(meth)," for example, "(meth) acryloyl" refers to acryloyl or methacryloyl.

Examples of prepolymers having radically polymerizable unsaturated groups include polyester (meth) acrylate, urethane (meth) acrylate, triazine (meth) acrylate, and silicon (meth) acrylate. The molecular weight is generally about 250 to 100,000.

Examples of preoplymers having cationically polymerizable functional groups include prepolymers of epoxy resins, such as bisphenol type epoxy resin and novolak type epoxy resin, and vinyl ether resins, such as aliphatic vinyl ether resin and aromatic vinyl ether resin.

Examples of monofunctional monomers having radically polymerizable unsaturated groups include monofunctional monomers of (meth) acrylate compounds, for example, methyl (meth) acrylate, 2-ethylhexyl (meth) acrylate, and phenoxyethyl (meth) acrylate.

Examples of polyfunctional monomers having radically polymerizable unsaturated groups include diethylene glycol di(meth)acrylate, propylene glycol di(meth)acrylate, trimethylolpropane tri(meth)acrylate, trimethylolpropane ethylene oxide tri(meth)acrylate, dipentaerythritol penta(meth) acrylate, and dipentaerythritol hexa(meth)acrylate.

Examples of monomers having thiol groups include trimethylolpropane trithioglycolate and dipentaerythritol tetrathioglycolate.

When curing is carried out by ultraviolet or visible light irradiation, a photopolymerization initiator is added to the coating composition containing an ionizing radiation curing resin. In the case of resin systems containing radically polymerizable unsaturated groups, acetophenones, benzophenones, thioxanthones, benzoin, and beonzoin methyl ethers may be used as the photopolymerization initiator either alone or as a mixture of two or more. On the other hand, in the case of resin systems containing cationically polymerizable functional groups, aromatic diazonium salts, aromatic sulfonium salts, aromatic iodonium salts, metallocene compounds, benzoinsulfonic esters and the like may be used as the photopolymerization initiator either alone or as a mixture of two or more.

The amount of the photopolymerization initiator added is about 0.1 to 10% by weight based on 100% by weight of the coating composition containing the ionizing radiation curing resin.

If necessary, the coating composition containing the ionizing radiation curing resin may further contain various additives. Examples of additives usable herein include: thermoplastic resins, such as vinyl chloride/vinyl acetate copolymer, polyvinyl acetate, acrylic resin, and cellulosic resin; fine powders of calcium carbonate, barium sulfate, silica, and alumina (in the form of sphere, polygon, flake and the like); extender pigments (fillers) of spherical powders; and colorants, such as dyes and pigments.

Ultraviolet light sources for curing the ionizing radiation curing resin usable herein include ultrahigh pressure mercury lamps, high pressure mercury lamps, and metal halide lamps. Wavelengths of the ultraviolet light used herein are mainly 1900 to 3800 Å.

Preferred examples of electron beam sources for curing the ionizing radiation curing resin include various electron beam accelerators, such as Cockcroft-Walton accelerator, van de Graaff accelerator, resonance transformer, insulted core transformer, linear, dynamitron, and high-frequency electron accelerators that can emit electron beams having an energy of 100 to 1000 KeV, preferably 100 to 300 KeV.

Figure 3:
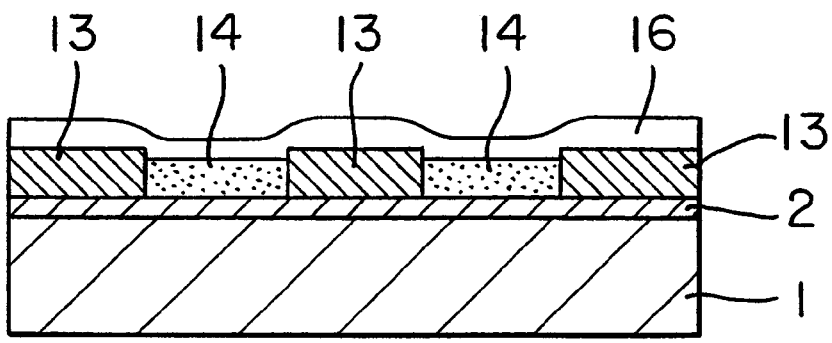
FIG. 3 is a cross-sectional view of a conventional decorative sheet.

For comparison with the synchronously embossed decorative sheet of the present invention, a conceptual diagram of a conventional decorative sheet comprising pseudo concaves and convexes formed by a top coat of a solvent-containing resin as described above is shown in FIG. 3. The decorative sheet shown in FIG. 3 comprises: a substrate sheet 1; a color solid print 2 provided on the substrate sheet 1; pattern layers 13, 14, provided on the color solid print 2, using a plurality of inks different from each other in the content of particulate solids; and a solvent-containing top coat 16 provided on the whole surface of the pattern layers 13, 14. In this conventional decorative sheet, however, the top coat 16, at the time of curing, causes a reduction in amount due to evaporation of the solvent, and, unlike the present invention, the nonpenetrable layer is absent. This results in a small difference in level on the surface of the top coat 16 between concave and convex, and, as a result, the surface effect is such an extent as attained by a difference in gloss, and the emboss is also unsatisfactory in sharpness. The decorative sheet of the present invention, after it is laminated onto various adherends and subjected to predetermined forming or the like, can be used for various applications. Examples of applications include interior decoration of buildings, such as walls, ceiling, and floors, surface decoration of fittings and fixtures, such as window frames, doors, and valustrades, surface decoration of cabinets of furniture, light electric appliances, and office automation appliances, interior decoration of vehicles, such as automobiles and electric trains, and interior decoration of aircraft.

EXAMPLES

Examples

A color solid print was formed using HAT (tradename, manufactured by The Inctec Inc.) as an acrylic resin ink by gravure printing on a tissue paper, for building materials, having a basis weight of 30 g/m². A pattern layer (a grain vessel pattern) was then printed using HAT (tradename, manufactured by The Inctec Inc.) as an acrylic resin ink on a part of the color solid print.

Next, a penetrable layer having the following composition (Table 1), a nonpenetrable layer having the following composition (Table 3), and a top coat layer having the following composition were formed on the substrate with the pattern layer formed thereon to produce decorative sheets of Examples 1 to 12 and Comparative Example 1. The decorative sheets of Examples 1 to 9 are those according to an embodiment shown in FIG. 2, the decorative sheets of Examples 10 to 12 are those according to an embodiment shown in FIG. 1, and the decorative sheet of Comparative Example 1 is one according to an embodiment shown in FIG. 3.

TABLE 1

<Penetrable layer> (numerical values being in wt %)

| | Binder resin | Inorganic particles | Carbon black | Solvent |
|---|---|---|---|---|
| Ex. 1 | Urethane 5 | 30 | 3 | A 62 |
| Ex. 2 | Urethane 5 | 30 | 3 | A 62 |
| Ex. 3 | Urethane 5 | 30 | 3 | A 62 |
| Ex. 4 | Butyral 5 | 30 | 3 | B 62 |
| Ex. 5 | Butyral 5 | 30 | 3 | B 62 |
| Ex. 6 | Butyral 5 | 30 | 3 | B 62 |
| Ex. 7 | Butyral 5 | 40 | 3 | B 52 |
| Ex. 8 | Butyral 4 | 46 | 3 | B 47 |
| Ex. 9 | Butyral 4 | 46 | 3 | B 47 |
| Ex. 10 | Butyral 5 | 40 | 3 | B 52 |
| Ex. 11 | Butyral 4 | 46 | 3 | B 47 |
| Ex. 12 | Butyral 4 | 46 | 3 | B 47 |
| Ex. 13 | Butyral 4 | 22 | 3 | B 47 |
| Comp. Ex. 1 | Butyral 4 | 46 | 3 | B 47 |

(1) Inorganic particles: silica (average particle diameter 10 μm)
(2) Solvent A: MEK/toluene/IPA B: Ethyl acetate/toluene
(3) In Example 13, 22 parts by weight of fine particle of alumina were added as inorganic particles.

TABLE 2

<Nonpenetrable layer> (numerical values being in wt %)

| | Binder resin | Inorganic particles | Solvent |
|---|---|---|---|
| Ex. 1 | Urethane 10 | 2 | A 88 |
| Ex. 2 | Urethane/polyester 10 | 2 | C 88 |
| Ex. 3 | Butyral 10 | 2 | B 88 |
| Ex. 4 | Butyral 10 | 2 | B 88 |
| Ex. 5 | Urethane 10 | 2 | A 88 |
| Ex. 6 | Urethane/polyester 10 | 2 | C 88 |
| Ex. 7 | Butyral 10 | 2 | B 88 |
| Ex. 8 | Butyral 10 | 2 | B 88 |
| Ex. 9 | Butyral 10 | 0 | B 88 |
| Ex. 10 | Butyral 10 | 2 | B 88 |
| Ex. 11 | Butyral 10 | 2 | B 88 |
| Ex. 12 | Butyral 10 | 0 | B 88 |
| Ex. 13 | Butyral 10 | 0 | B 88 |
| Comp. Ex. 1 | Butyral 10 | 0 | B 88 |

(1) Inorganic particles: silica (average particle diameter 10 μm)
(2) Solvent A: MEK/toluene/IPA B: Ethyl acetate/toluene
(3) The nonpenetrable layer was formed at a coverage of 5 g/m² on a dry basis.
(4) In Comparative Example 1, the pattern layer is a layer which should serve also as the nonpenetrable layer, and, for this reason, 2 parts by weight of a brown pigment was added to the nonpenetrable layer in Comparative Example 1.

An ionizing radiation curing resin coating composition was prepared according to the following formulation and then roll coated on the whole surface of the prints to form a top coat, followed by electron beam irradiation conditions of 175 kV and 5 Mrad.

Electron beam curing resin coating composition (top coat):
Urethane acrylate/monomer/silica (average particle diameter 5 μm)=20:60:20

The decorative sheets thus obtained were evaluated, and the results are summarized as follows.

Example 1

There were a difference in glossiness between gloss portion and non-gloss portion and a difference in level between concave and convex.

Example 2

There were a difference in glossiness between gloss portion and non-gloss portion and a difference in level between concave and convex.

Example 3

There were a difference in glossiness between gloss portion and non-gloss portion and a difference in level between concave and convex, although the sharpness of the concave-convex pattern was lower than that in Examples 1 and 2.

Example 4

There were a difference in glossiness between gloss portion and non-gloss portion and a difference in level between concave and convex.

Example 5

There were a difference in glossiness between gloss portion and non-gloss portion and a difference in level between concave and convex.

Example 6

There were a difference in glossiness between gloss portion and non-gloss portion and a difference in level between concave and convex.

Example 7

There were a difference in glossiness between gloss portion and non-gloss portion and a relatively clear difference in level between concave and convex.

Example 8

There were a difference in glossiness between gloss portion and non-gloss portion and a relatively clear difference in level between concave and convex, and the three-dimensional effect of the pattern was further improved.

Example 9

There were a difference in glossiness between gloss portion and non-gloss portion and a relatively clear difference in level between concave and convex, and the three-dimensional effect of the pattern was further improved over that in Example 8.

Example 10

The three-dimensional effect of concave and convex was further improved over that in Example 7.

Example 11

The three-dimensional effect of concave and convex was further improved over that in Example 8.

Example 12

The three-dimensional effect was further improved over that in Example 9.

Example 13

There were a difference in glossiness between gloss portion and non-gloss portion and a relatively clear difference in level between concave and convex, and the three-dimensional effect of the pattern was further improved over that in Example 8.

Comparative Example 1

Although there was a difference in glossiness between gloss portion and non-gloss portion, substantially no difference in level was present between concave and convex.

As is apparent from the results of the examples and the comparative examples, according to the present invention, a nonpenetrable layer is formed on a pattern layer so as to tune with the pattern of the pattern layer, and a top coat is formed thereon. This arrangement enables concaves and convexes to be more effectively formed, and the difference in level in emboss of the pattern layer can be further increased. Therefore, realistic appearance close to the actual object can be developed. Further, according to the present invention, a pattern layer containing a colorant, such as a pigment, and a nonpenetrable layer for preventing the penetration of the ionizing radiation curing resin constituting the top coat are provided separately and in the thicknesswise direction. Therefore, the function of the pattern layer can be separated from the function of the nonpenetrable layer provided in tune with the pattern layer. That is, a desired pigment can be freely used in the pattern layer. Further, since the nonpenetrable layer is further provided in combination with the pattern layer, the penetration of the ionizing radiation curing layer constituting the top coat can be effectively prevent. Therefore, both this penetration preventive effect and the stacking effect attained by provision of the pattern layer and the nonpenetrable layer in combination in the thicknesswise direction can render the embossing effect of the pattern in the pattern layer more conspicuous.

Further, according to the present invention, a solvent-free coating composition may be used as the top coat. Therefore, a reduction in layer thickness does not occur upon curing of the top coat, and the thickness of the coating immediately after the formation remains unchanged upon conversion to the cured layer. Therefore, as compared with the use of a solvent type resin in the top coat, the use of the solvent-free coating composition can provide higher emboss height and hence can provide a sharper emboss.

Further, according to the synchronously embossed decorative sheet of the present invention, since a coating composition containing an ionizing radiation curing resin is used in the top coat, the surface hardness is so high that the scratch resistance is good.

What is claimed is:

1. A synchronously embossed decorative sheet comprising:
   a substrate;
   a pattern layer provided on the substrate;
   a penetrable layer provided on the substrate only in its portions not having thereon the pattern layer, the penetrable layer comprising a coating composition penetrable by an ionizing radiation curing resin;

a nonpenetrable layer provided, on the pattern layer, in tune with the pattern in the pattern layer, the nonpenetrable layer comprising a coating composition nonpenetrable by an ionizing radiation curing resin; and a top coat layer of an ionizing radiation curing resin provided so as to cover said layers on the substrate, whereby said ionizing radiation curing resin penetrates into said penetrable layer thereby reducing the thickness of said top coat layer so that it conforms to the shape of concaves and convexes in the pattern layer.

2. A synchronously embossed decorative sheet comprising:

a substrate;

a pattern layer provided on the substrate;

a penetrable layer provided on the substrate so as to cover the pattern layer, the penetrable layer comprising a coating composition being penetrable by an ionizing radiation curing resin;

a nonpenetrable layer provided, on the penetrable layer, in tune with the pattern in the pattern layer, the nonpenetrable layer comprising a coating composition being nonpenetrable by an ionizing radiation curing resin; and a top coat layer of an ionizing radiation curing resin provided so as to cover said layers on the substrate, whereby said ionizing radiation curing resin penetrates into said penetrable layer thereby reducing the thickness of said top coat layer so that it conforms to the shape of concaves and convexes in the pattern layer.

3. The decorative sheet according to claim 1, wherein a color solid print layer is provided between the substrate and the pattern layer.

4. The decorative sheet according to claim 1, wherein there is a negative-positive relationship between the pattern of the penetrable layer and the nonpenetrable layer.

5. The decorative sheet according to claim 3, wherein the color solid print has a penetration preventive property.

6. The decorative sheet according to claim 1, wherein the coating composition constituting the penetrable layer comprises less than 5% by weight of a binder resin and 10 to 60% by weight of inorganic particles.

7. The decorative sheet according to claim 1, wherein the coating composition constituting the nonpenetrable layer comprises less than 5% by weight of the inorganic particles.

8. The decorative sheet according to claim 1, wherein the binder resin constituting the penetrable layer and the nonpenetrable layer comprises a butyral resin.

9. The decorative sheet according to claim 6, wherein the inorganic particles are selected from the group consisting of particles of silica, calcium carbonate, zeolite, barium sulfate, and mixtures thereof.

10. The decorative sheet according to claim 1, wherein the coating composition constituting the penetrable layer comprises a binder resin and a foaming agent.

* * * * *